(12) United States Patent
Kondo et al.

(10) Patent No.: US 11,840,140 B2
(45) Date of Patent: Dec. 12, 2023

(54) COMBINATION VEHICLE, TRAILER, AND TRACTOR

(71) Applicants: TOYOTA JIDOSHA KABUSHIKI KAISHA, Toyota (JP); HINO MOTORS, LTD., Hino (JP)

(72) Inventors: Toshiyuki Kondo, Chiryu (JP); Yukihide Yokoyama, Toyota (JP)

(73) Assignees: TOYOTA JIDOSHA KABUSHIKI KAISHA, Toyota (JP); HINO MOTORS, LTD., Tokyo (JP)

( * ) Notice: Subject to any disclaimer, the term of this patent is extended or adjusted under 35 U.S.C. 154(b) by 715 days.

(21) Appl. No.: 16/996,464

(22) Filed: Aug. 18, 2020

(65) Prior Publication Data

US 2021/0101473 A1  Apr. 8, 2021

(30) Foreign Application Priority Data

Oct. 2, 2019 (JP) .................. 2019-181993

(51) Int. Cl.
| | | |
|---|---|---|
| *B60K 15/063* | (2006.01) | |
| *B60K 15/01* | (2006.01) | |
| *F16L 37/40* | (2006.01) | |
| *B60D 1/62* | (2006.01) | |
| *B60K 15/03* | (2006.01) | |

(Continued)

(52) U.S. Cl.
CPC .............. *B60K 15/063* (2013.01); *B60D 1/62* (2013.01); *B60K 15/01* (2013.01); *B60L 50/71* (2019.02); *B62D 53/0842* (2013.01); *F16L 37/40* (2013.01); *B60K 2015/03315* (2013.01);

(Continued)

(58) Field of Classification Search
CPC ...... B60K 15/00; B60K 15/01; B60K 15/013; B60K 15/03; B60K 15/03006; B60K 15/06; B60K 15/063; B60K 15/07; B60K 2015/03013; B60K 2015/03026; B60K 2015/03118; B60K 2015/03144; B60K 2015/03151; B60K 2015/03315; B60K 2015/0634; B60K 2015/0636; B60K 2015/0638; B60K 2015/0639; B60D 1/62; F16L 37/40; B60L 2200/28
See application file for complete search history.

(56) References Cited

U.S. PATENT DOCUMENTS

2003/0178423 A1* 9/2003 Sugiyama .............. B60K 15/07
220/4.14
2008/0098562 A1* 5/2008 Tagliaferri ................ E01H 1/00
15/340.1

(Continued)

FOREIGN PATENT DOCUMENTS

| GB | 2391847 A | 2/2004 |
|---|---|---|
| JP | 2017-002866 A | 1/2017 |
| JP | 2018-114816 A | 7/2018 |

*Primary Examiner* — Jacob D Knutson
*Assistant Examiner* — Maurice L Williams
(74) *Attorney, Agent, or Firm* — HUNTON ANDREWS KURTH LLP

(57) ABSTRACT

A combination vehicle includes a tractor and a trailer towed by the tractor. The trailer includes a first tank that is configured to store a high-pressure gas as a fuel used by the tractor to travel. The tractor includes a second tank that is configured to store a high-pressure gas as a fuel used by the tractor to travel. The combination vehicle is configured to travel using the fuel supplied from the first tank and the second tank.

14 Claims, 4 Drawing Sheets

(51) Int. Cl.
*B60L 50/71* (2019.01)
*B62D 53/08* (2006.01)
*F16L 37/127* (2006.01)

(52) U.S. Cl.
CPC ... *B60K 2015/0638* (2013.01); *B60L 2200/36* (2013.01); *F16L 37/127* (2013.01)

(56) References Cited

U.S. PATENT DOCUMENTS

| | | | | |
|---|---|---|---|---|
| 2012/0291902 | A1* | 11/2012 | Mori | F17C 5/06 138/40 |
| 2014/0138173 | A1* | 5/2014 | Gibb | B60K 15/077 180/69.5 |
| 2014/0299101 | A1* | 10/2014 | Melanson | B60K 15/07 123/445 |
| 2015/0060160 | A1* | 3/2015 | Kerschl | B60L 9/00 180/54.1 |
| 2015/0107681 | A1* | 4/2015 | Killeen | F16K 11/08 137/12 |
| 2015/0123393 | A1* | 5/2015 | Jackson | B60K 15/07 280/834 |
| 2015/0159564 | A1* | 6/2015 | Wildgrube | F02M 21/0221 180/69.5 |
| 2015/0183317 | A1* | 7/2015 | Lee | B60K 15/07 180/309 |
| 2016/0229286 | A1* | 8/2016 | Baik | B60K 15/03519 |
| 2018/0093563 | A1* | 4/2018 | Matijevich | F17C 13/083 |
| 2018/0120282 | A1* | 5/2018 | Booher | G01N 25/00 |
| 2018/0205106 | A1 | 7/2018 | Kaisha | |
| 2020/0139808 | A1* | 5/2020 | Rike | F17C 1/00 |

* cited by examiner

COMBINATION VEHICLE, TRAILER, AND TRACTOR

CROSS-REFERENCE TO RELATED APPLICATION

The disclosure of Japanese Patent Application No. 2019-181993 filed on Oct. 2, 2019 including the specification, drawings and abstract is incorporated herein by reference in its entirety.

BACKGROUND

1. Technical Field

The present disclosure relates to combination vehicles, trailers and tractors.

2. Description of Related Art

Conventionally, there is a fuel cell vehicle that includes a tank that stores hydrogen gas, a fuel cell system that generates electric power using the hydrogen gas supplied from the tank, and a motor that is driven by the electric power supplied from the fuel cell system (refer to Japanese Unexamined Patent Application Publication No. 2018-114816 (JP 2018-114816 A)).

SUMMARY

A combination vehicle includes a tractor and a trailer. The trailer in which a cargo that is a transportation target is loaded does not generate a drive force by itself. In the tractor that is equipped with a prime mover and tows the trailer, a cargo that is a transportation target is not loaded. For this reason, the tractor is smaller in size than the trailer. The combination vehicle consumes a large amount of energy compared to a passenger car because the combination vehicle travels with a large amount of cargoes loaded therein. Therefore, when the tractor that tows the trailer is configured as a fuel cell vehicle, a sufficient length of traveling distance may not be secured by hydrogen stored in the tank that can be mounted in a tractor, which is smaller than the trailer, with one charging of the hydrogen. The issue above is common among combination vehicles that travel using various types of substances as a fuel in addition to the vehicle that travels using the hydrogen as the fuel.

The present disclosure can be realized in the aspects below.

A first aspect of the present disclosure relates to a combination vehicle. The combination vehicle includes: a tractor; and a trailer towed by the tractor. The trailer includes a first tank that is configured to store a high-pressure gas as a fuel used by the tractor to travel. The tractor includes a second tank that is configured to store a high-pressure gas as a fuel used by the tractor to travel. The combination vehicle is configured to travel using the fuel supplied from the first tank and the second tank.

According to the first aspect above, a travel distance of the combination vehicle with one charging of the fuel can be extended compared to a form in which only the tractor is equipped with the tank that stores the fuel.

A second aspect of the disclosure relates to a trailer configured to be coupled to a tractor that travels using a fuel gas. The trailer includes: a tank that is configured to store a high-pressure gas as a fuel used by the tractor to travel; a first type pipe that is configured to be connected to the tank; a pressure reduction portion that is configured to be connected to the first type pipe and reduce a pressure of the fuel gas supplied from the tank through the first type pipe; and a second type pipe that is configured to be connected to the pressure reduction portion and includes an outlet connection portion that is configured to be connected to an inlet connection portion that is provided in the tractor and receives the fuel gas, wherein at least a part of the second type pipe may have a lower rigidity than a rigidity of the first type pipe.

According to the second aspect above, the first type pipe has a higher rigidity than that of the second type pipe. Therefore, a high-pressure fuel gas stored in the tank can be stably distributed. Further, the second type pipe has a lower rigidity than that of the first type pipe. Therefore, when a relative position between the trailer and the tractor changes at a coupled portion, a fuel gas supply path from the trailer to the tractor can be maintained by deformation of the second type pipe.

In the second aspect above, the outlet connection portion may be configured to allow flowing of the fuel gas when the outlet connection portion is connected to the inlet connection portion. The outlet connection portion may be configured not to allow flowing of the fuel gas when the outlet connection portion is not connected to the inlet connection portion.

With the configuration above, an user can switch to a state where the fuel gas can be supplied from the trailer to the tractor with a simple procedure by connecting the outlet connection portion of the trailer to the inlet connection portion of the tractor.

In the aspect above, the trailer may be configured such that the outlet connection portion and the inlet connection portion are disconnected prior to a breakage of a part of a configuration that allows flowing of the fuel from the tank to the outlet connection portion when a tensile force is applied between the inlet connection portion and the outlet connection portion in a state where the inlet connection portion and the outlet connection portion are connected to each other.

With the configuration above, for example, in the case where a relative distance between the trailer and the tractor increases for some reason when the outlet connection portion and the inlet connection portion are connected to each other, a possibility of leakage of the fuel caused by the breakage of the configuration that allows flowing of the fuel from the tank to the outlet connection portion can be reduced.

In the aspect above, the trailer may further includes a king pin that is configured to be coupled to a coupler of the tractor. The pressure reduction portion may be disposed below a base portion of the king pin.

With the configuration above, a space for loading cargoes can be enlarged in the trailer compared to a form in which the pressure reduction portion is disposed above the base portion of the king pin.

In the aspect above, the pressure reduction portion may be provided so as to be disposed between an end of the tractor and the king pin in a right-left direction of the tractor in a state where the trailer is coupled to the tractor via the king pin and the coupler.

With the configuration above, a distance between the pressure reduction portion and the outlet connection portion in which the fuel gas is distributed through the second type pipe can be shortened compared to a form in which the pressure reduction portion is disposed at a rear end portion of the trailer. Accordingly, a possibility that the second type pipe having a lower rigidity than that of the first type pipe is broken by an external force can be reduced.

In the aspect above, the trailer may be configured such that the outlet connection portion and the inlet connection portion are disconnected by a breakage of a part of a configuration of the inlet connection portion and the outlet connection portion prior to the breakage of the part of the configuration that allows flowing of the fuel from the tank to the outlet connection portion.

A third aspect of the present disclosure relates to a tractor that is coupled to the trailer according to the aspect above. The tractor includes the inlet connection portion. The inlet connection portion includes a check valve that is configured to allow reception of a gas from an outside and not to allow sending out of the gas to the outside.

According to the third aspect above, when disconnecting the inlet connection portion from the outlet connection portion, the fuel gas does not flow out from the inlet connection portion of the tractor without an operation by the user to stop a flow of the gas at the inlet connection portion of the tractor.

In the aspect above, the tank may be a first tank. The tractor may include a second tank that is configured to stores a high-pressure gas as a fuel used by the tractor to travel. The combination vehicle may be configured to travel using the fuel supplied from the first tank and the second tank.

The present disclosure can be realized in various modes other than the combination vehicle, the trailer, or the tractor. For example, the present disclosure can be realized in modes such as a method of manufacturing the combination vehicle, the trailer, or the tractor, and a method of controlling the combination vehicle, the trailer, or the tractor.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A. First Embodiment

Figure 1:
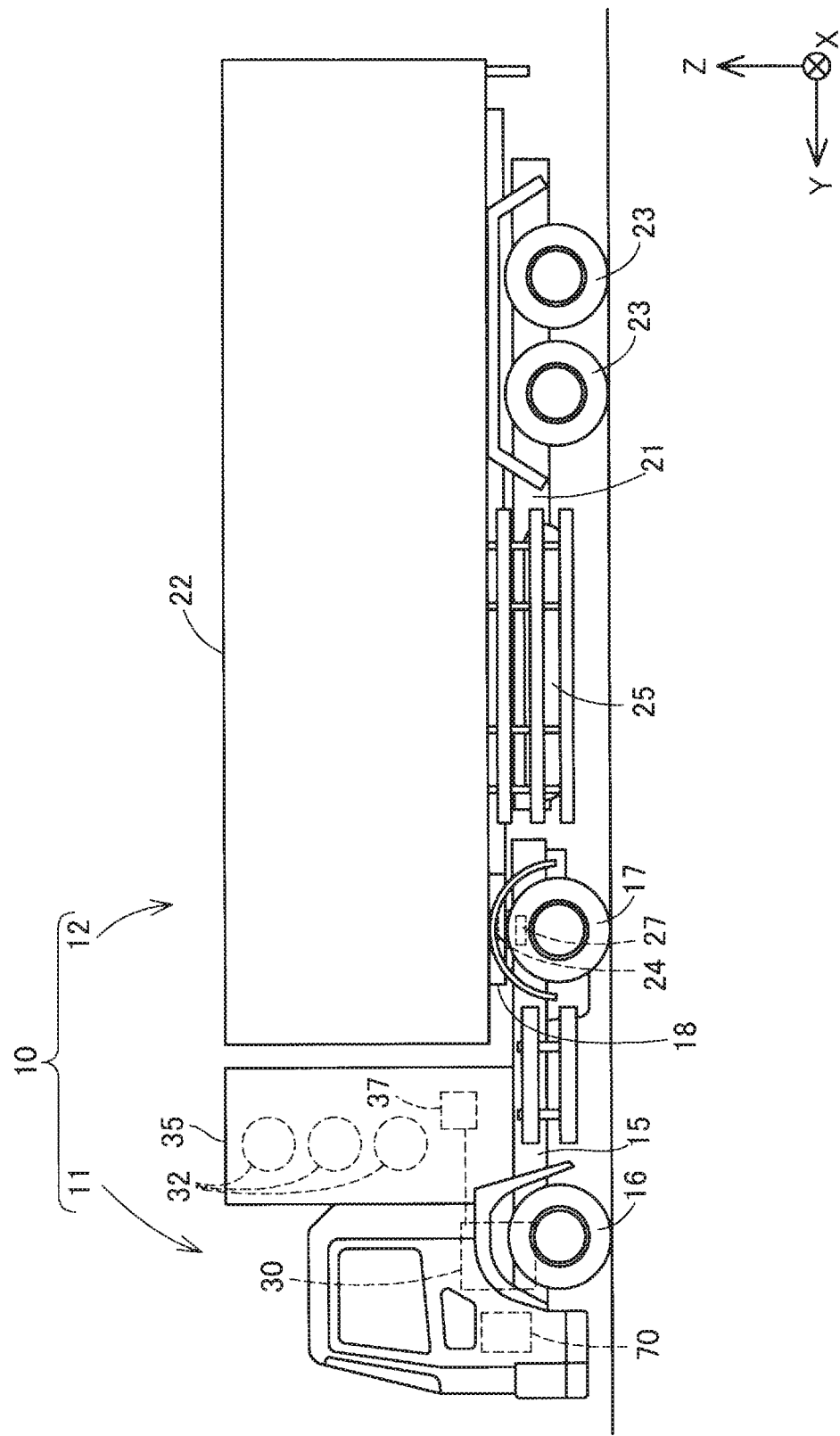
FIG. 1 is a side view showing a combination vehicle according to an embodiment.

FIG. 1 is a side view showing a combination vehicle 10 according to a first embodiment. In this specification, a forward direction of the combination vehicle 10 is defined as a Y direction. A right direction of the combination vehicle 10 is defined as an X direction. An upper direction of the combination vehicle 10 is defined as a Z direction. FIG. 1 shows the X direction, the Y direction, and the Z direction. The X, Y, and Z directions shown in FIG. 3 match the X, Y, and Z directions shown in FIG. 1.

The combination vehicle 10 is a vehicle that loads and transports a cargo that is a transport target. The combination vehicle 10 includes a tractor 11 and a trailer 12.

The tractor 11 is coupled to the trailer 12 and tows the trailer 12. The tractor 11 travels using hydrogen gas. More specifically, the tractor 11 is driven using the hydrogen gas supplied from a plurality of tanks 32 mounted in the tractor 11 and a tank 25 mounted in the trailer 12. The tractor 11 includes a frame 15, front wheels 16, rear wheels 17, a coupler 18, the tanks 32, a pressure reduction portion 37, a fuel cell 30, a storage portion 35, and a motor 70.

The frame 15 supports each of the components of the tractor 11. The fuel cell 30 generates electric power using the hydrogen gas supplied from the tanks 32 and the tank 25 of the trailer 12. The motor 70 is driven by the electric power supplied from the fuel cell 30. The rear wheels 17 rotate by a drive force transmitted from the motor 70. The front wheels 16 rotate as the tractor 11 moves by the rotation of the rear wheels 17. The storage portion 35 houses the plurality of tanks 32.

The coupler 18 is connected to a king pin 24 of the trailer 12 and holds the king pin 24 such that the king pin 24 is turnable. Consequently, the trailer 12 is coupled to the tractor 11. The trailer 12 is turnable within a certain range with the king pin 24 as a center of turn in a state where the trailer 12 is coupled to the tractor 11. Consequently, a relative position of the trailer 12 to the tractor 11 can be changed.

Figure 2:
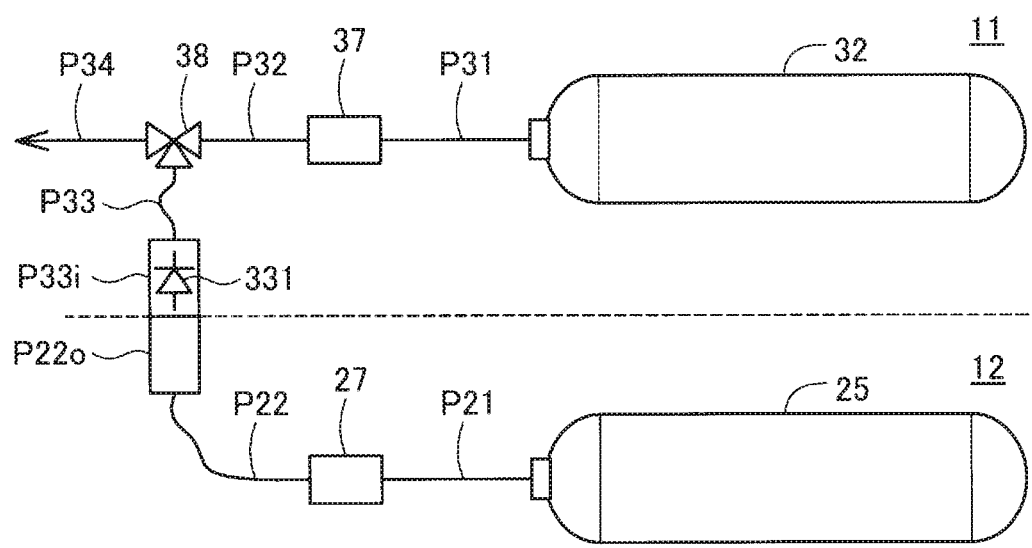
FIG. 2 is an explanatory diagram showing a hydrogen supply system for a tractor and a trailer.

FIG. 2 is an explanatory diagram showing a hydrogen supply system for the tractor 11 and the trailer 12. The tractor 11 further includes a first pipe P31, a second pipe P32, a third pipe P33, and a fourth pipe P34, and a three-way valve 38.

Each of the tank 32 stores a high-pressure gas as a fuel used by the tractor 11 to travel. More specifically, the tank 32 stores the hydrogen gas as a fuel gas. The tank 32 can store the hydrogen gas at a pressure of 70 MPa at the maximum. The first pipe P31 is connected to the tank 32. The first pipe P31 is made of stainless steel.

The pressure reduction portion 37 is connected to the first pipe P31. The pressure reduction portion 37 reduces the pressure of the hydrogen gas supplied through the first pipe P31. More specifically, the pressure reduction portion 37 reduces the pressure of the hydrogen gas to 2 MPa. The second pipe P32 is connected to the pressure reduction portion 37. The second pipe P32 is mainly made of rubber.

The three-way valve 38 is connected to the second pipe P32, the third pipe P33, and the fourth pipe P34. The three-way valve 38 can selectively connect the second pipe P32 or the third pipe P33 to the fourth pipe P34. The fourth pipe P34 connects the three-way valve 38 and the fuel cell 30. The fourth pipe P34 is mainly made of rubber.

The third pipe P33 includes an inlet connection portion P33$i$. The inlet connection portion P33$i$ receives the hydrogen gas from the trailer 12. More specifically, the inlet connection portion P33$i$ is connected to an outlet connection portion P22$o$ that is provided in the trailer 12 and sends out the hydrogen gas. The inlet connection portion P33$i$ includes a check valve 331. The inlet connection portion P33$i$ allows reception of a gas from the outside and does not allow sending out of the gas to the outside using the check valve 331.

With this configuration, when disconnecting the inlet connection portion P33$i$ from the outlet connection portion P22$o$, the hydrogen gas does not flow out from the inlet connection portion P33$i$ of the tractor 11 without an operation by a user to stop a flow of the gas at the inlet connection portion P33i of the tractor 11.

A portion of the third pipe P33 that connects the three-way valve 38 and the inlet connection portion P33i is made of rubber. Consequently, the portion of the third pipe P33 that connects the three-way valve 38 and the inlet connection portion P33i has a lower rigidity than the rigidity of the first pipe P31.

The trailer 12 loads a cargo that is a transport target (refer to FIG. 1). The trailer 12 is coupled to the tractor 11 and is towed by the tractor 11. The trailer 12 includes a frame 21, a container 22, wheels 23, the king pin 24, the tank 25, and a pressure reduction portion 27.

The frame 21 supports each of the components of the trailer 12. The container 22 stores the cargo that is the transport target. The wheels 23 rotate as the trailer 12 is towed by the tractor 11.

The king pin 24 has a rod-shaped structure that protrudes downward at a front portion of a lower surface of the trailer 12. The king pin 24 is coupled to the coupler 18 of the tractor 11 and turnably held by the coupler 18. Consequently, the trailer 12 is coupled to the tractor 11.

The trailer 12 further includes a first pipe P21 and a second pipe P22 (refer to FIG. 2). The tank 25 stores a high-pressure gas as a fuel used by the tractor 11 to travel. More specifically, the tank 25 stores the hydrogen gas as a fuel gas. The tank 25 can store the hydrogen gas at a pressure of 70 MPa at the maximum.

With this configuration, a travel distance of the combination vehicle 10 with one charging of the hydrogen gas can be extended compared to a mode in which only the tractor 11 that includes the fuel cell 30 and the motor 70 and serves as a fuel cell vehicle is equipped with a tank that stores the hydrogen gas.

The first pipe P21 is connected to the tank 25. The first pipe P21 is made of stainless steel. The first pipe P21 has a higher rigidity than that of the second pipe P22. Therefore, a high-pressure hydrogen gas stored in the tank 25 can be stably distributed.

The pressure reduction portion 27 is connected to the first pipe P21. The pressure reduction portion 27 reduces the pressure of the hydrogen gas supplied through the first pipe P21. More specifically, the pressure reduction portion 27 reduces the pressure of the hydrogen gas to 2 MPa. With this configuration, the hydrogen gas can be supplied from the trailer 12 to the tractor 11 through the second pipe P22 having a lower rigidity than that of the first pipe P21.

The second pipe P22 is connected to the pressure reduction portion 27. The second pipe P22 includes the outlet connection portion P22o. The outlet connection portion P22o sends out the hydrogen gas to the tractor 11. More specifically, the outlet connection portion P22o is connected to the inlet connection portion P33i that is provided in the tractor 11 and receives the hydrogen gas.

With this configuration, the hydrogen gas can be supplied from the tank 25 mounted in the trailer 12 to the tractor 11 by connecting the outlet connection portion P22o of the second pipe P22 to the inlet connection portion P33i of the tractor 11. Consequently, a travel distance of the combination vehicle 10 with one charging of the hydrogen gas can be extended compared to a mode in which only the tractor 11 is equipped with a tank that stores the hydrogen gas and the trailer 12 is not equipped with the tank that stores the hydrogen gas.

A portion of the second pipe P22 that connects the pressure reduction portion 27 and the outlet connection portion P22o is made of rubber. Consequently, the portion of the second pipe P22 that connects the pressure reduction portion 27 and the outlet connection portion P22o has a lower rigidity than that of the first pipe P21.

With this configuration, when the relative position between the trailer 12 and the tractor 11 changes at the coupled portion, a hydrogen gas supply path from the trailer 12 to the tractor 11 can be maintained by deformation of the second pipe P22 without breaking the supply path.

The magnitude of the rigidity of the pipes can be determined as follows. A linear pipe having the same length as that of the pipe to be compared is prepared. The same load is applied to the center of each pipe while supporting both ends of each pipe. The magnitude of the rigidity of the pipes can be determined by comparing deformation amounts at the center along a load direction of the pipes.

Figure 3:
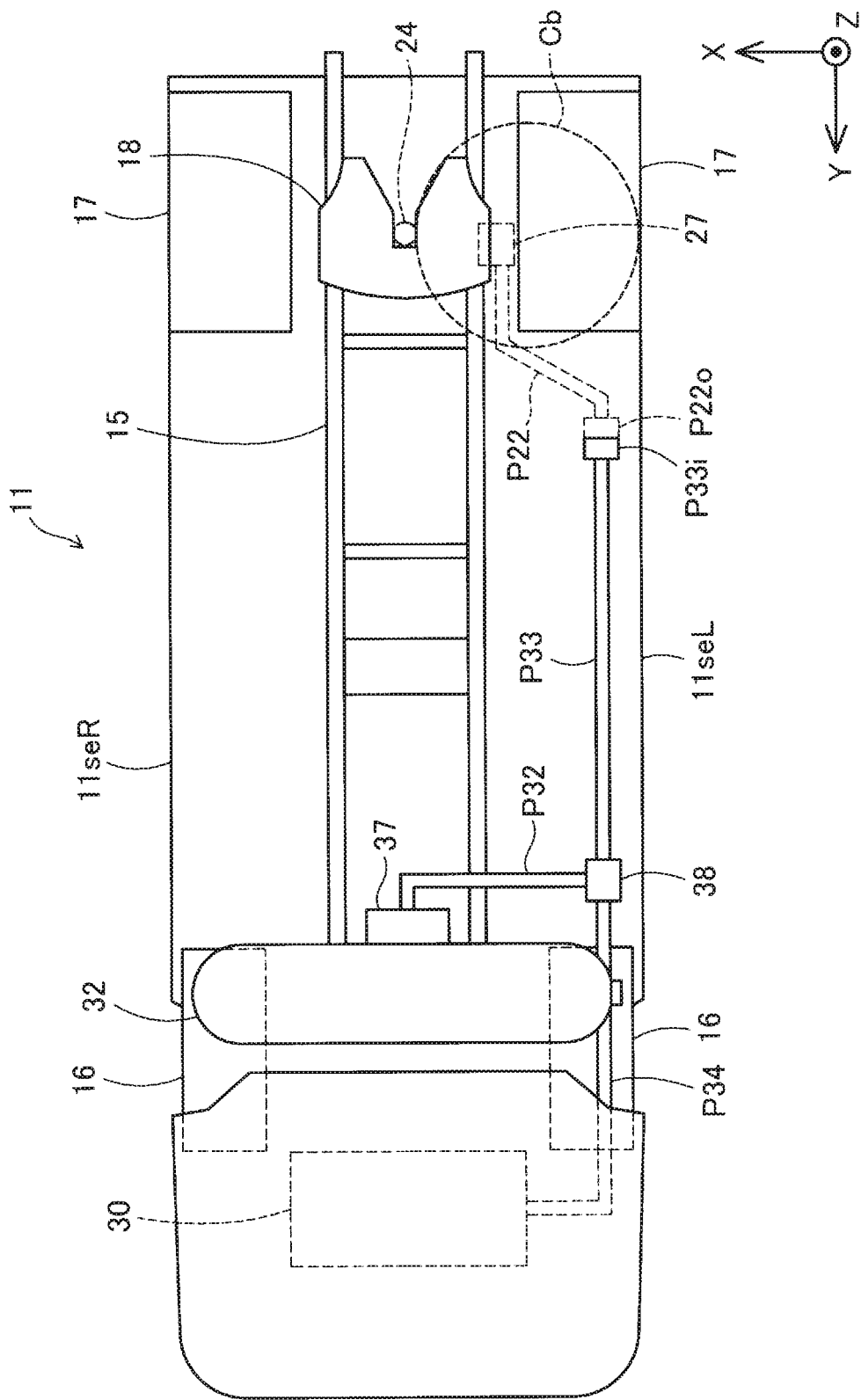
FIG. 3 is a plan view showing an arrangement of a king pin and a pressure reduction portion of the trailer with respect to components in the tractor when the trailer is coupled to the tractor.

FIG. 3 is a plan view showing an arrangement of the king pin 24 and the pressure reduction portion 27 of the trailer 12 with respect to the components in the tractor 11 when the trailer 12 is coupled to the tractor 11. As described above, the king pin 24 is received by the coupler 18 of the tractor 11 and turnably held by the coupler 18 (refer to the middle right portion in FIG. 3).

The pressure reduction portion 27 is disposed below a base portion of the king pin 24 (refer to the lower left portion in FIG. 1). The king pin 24 has a rod-shaped structure that protrudes downward at a front portion of the lower surface of the trailer 12. Therefore, the base portion of the king pin 24 is an upper end of the king pin 24. With this configuration, a capacity of the container 22 to load the cargoes in the trailer 12 can be increased compared to a mode in which the pressure reduction portion 27 is disposed above the base portion of the king pin 24.

The pressure reduction portion 27 is provided so as to be disposed between an left end 11 seL of the tractor 11 and the king pin 24 in a right-left direction of the tractor 11 in the state where the trailer 12 is coupled to the tractor 11 through the king pin 24 and the coupler 18 (refer to the lower right portion in FIG. 3). In the present specification, the phrase that the pressure reduction portion 27 is "disposed between an left end 11 seL of the tractor 11 and the king pin 24 in a right-left direction of the tractor 11" means that at least a part of the pressure reduction portion 27 is provided in a circle Cb that is inscribed with the end 11 seL of the tractor 11 and the king pin 24.

With this configuration, a distance between the pressure reduction portion 27 and the outlet connection portion P22o in which the hydrogen gas is distributed through the second pipe P22 can be shortened compared to a mode in which the pressure reduction portion 27 is disposed at a rear end portion of the trailer 12 that is distant away from the king pin 24. Accordingly, a possibility that the second pipe P22 having a lower rigidity than that of the first pipe P21 is broken by an external force can be reduced.

Figure 4:
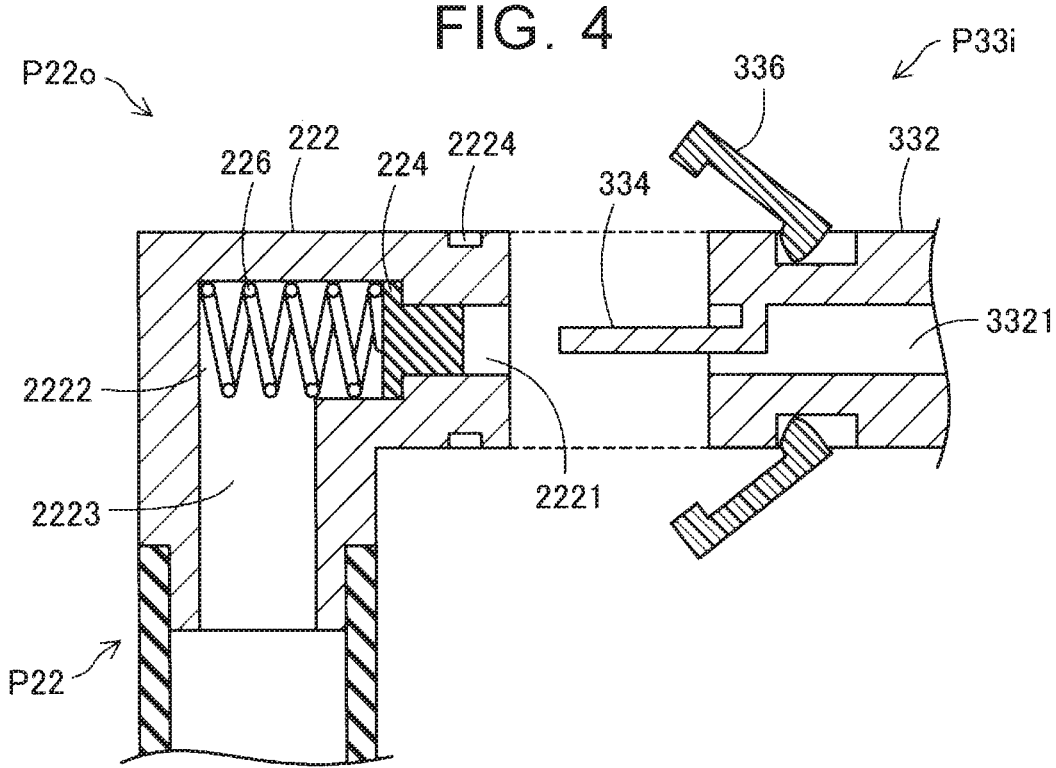
FIG. 4 is a sectional view showing the configuration of an outlet connection portion of the trailer and an inlet connection portion of the tractor.

FIG. 4 is a sectional view showing the configuration of the outlet connection portion P22o of the second pipe P22 of the trailer 12 and the inlet connection portion P33i of the third pipe P33 of the tractor 11. Note that, FIG. 4 is a diagram for explaining functions of the components, and does not show accurate shapes of the outlet connection portion P22o and the inlet connection portion P33i.

The outlet connection portion P22o includes a body 222, a valve body 224, and a coil spring 226. The body 222 constitutes a flow path of the outlet connection portion P22o. The body 222 houses the valve body 224 and the coil spring 226 therein. The body 222 includes a first flow path portion 2221, a second flow path portion 2222, a third flow path portion 2223, and a pair of recessed portions 2224.

The first flow path portion 2221 is a cylindrical space including an open end of the outlet connection portion P22o. The second flow path portion 2222 is a columnar space that shares a central axis with the first flow path portion 2221. The diameter of the second flow path portion 2222 is larger than the diameter of the first flow path portion 2221. The third flow path portion 2223 is a cylindrical space that is connected to the second flow path portion 2222 at a right angle. The diameter of the third flow path portion 2223 is equal to the diameter of the second flow path portion 2222.

The pair of recessed portions 2224 are arranged at an outer circumferential portion in proximity to the open end of the body 222 with the open end interposed between the pair of recessed portions 2224 The pair of recessed portions 2224 receive tip ends of a pair of fixtures 336 of the inlet connection portion P33i when the outlet connection portion P22o and the inlet connection portion P33i are connected to each other.

The valve body 224 and the coil spring 226 are housed in the second flow path portion 2222. One end of the coil spring 226 is in contact with a wall of the second flow path portion 2222 on one end. The other end of the coil spring 226 is in contact with the valve body 224. The coil spring 226 applies a force to the valve body 224 to press the valve body 224 against a wall of the second flow path portion 2222 on the other side, that is, a step between the first flow path portion 2221 and the second flow path portion 2222. Consequently, in the state shown in FIG. 4, the outlet connection portion P22o is sealed by the valve body 224.

The inlet connection portion P33i of the tractor 11 includes a body 332, a pressing rod 334, and the pair of fixtures 336. The body 332 constitutes a flow path of the inlet connection portion P33i. The body 332 includes a flow path portion 3321. The flow path portion 3321 is a columnar space that penetrates through the inlet connection portion P33i.

The pair of fixtures 336 are disposed at an outer peripheral portion of the body 332 in proximity to an open end of the body 332 with the open end interposed between the pair of fixtures 336. One end of each fixture 336 is turnably attached to the body 332. The tip end of the fixture 336 is received by the corresponding recessed portion 2224 of the outlet connection portion P22o when the outlet connection portion P22o and the inlet connection portion P33i are connected to each other.

A part of the pressing rod 334 is disposed in the flow path portion 3321. One end of the pressing rod 334 is fixed to an inner wall of the flow path portion 3321. Another part of the pressing rod 334 protrudes from the open end of the body 332 along an axial direction of the flow path portion 3321.

Figure 5:
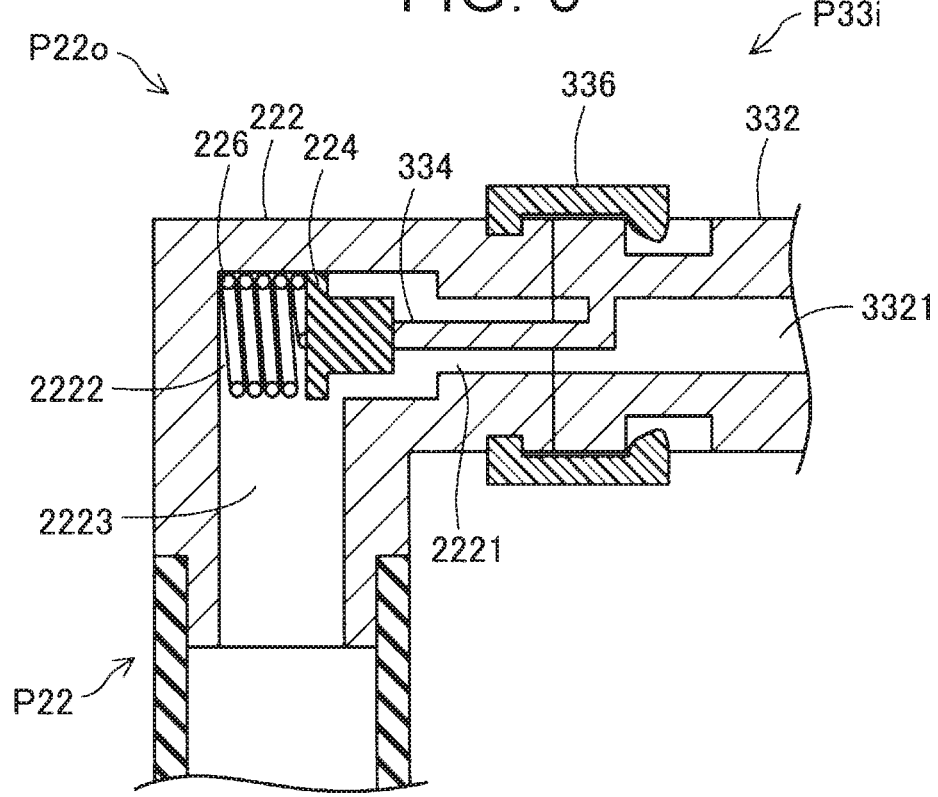
FIG. 5 is a sectional view showing the configuration of the outlet connection portion of the trailer and the inlet connection portion of the tractor.

FIG. 5 is a sectional view showing configurations of the outlet connection portion P22o of the trailer 12 and the inlet connection portion P33i of the tractor 11. FIG. 4 shows a state where the outlet connection portion P22o and the inlet connection portion P33i are not connected to each other, and FIG. 5 shows a state where the outlet connection portion P22o and the inlet connection portion P33i are connected to each other. FIG. 5 is a diagram for explaining functions of the components and does not show accurate shapes of the outlet connection portion P22o and the inlet connection portion P33i.

When the outlet connection portion P22o and the inlet connection portion P33i are connected to each other, the valve body 224 is pressed by the pressing rod 334 toward the coil spring 226. The valve body 224 then moves away from the step between the second flow path portion 2222 and the first flow path portion 2221 of the outlet connection portion P22o. Consequently, communication between the first flow path portion 2221 and the second flow path portion 2222 is established. In this state, the third flow path portion 2223, the second flow path portion 2222, and the first flow path portion 2221 of the outlet connection portion P22o and the flow path portion 3321 of the inlet connection portion P33i communicate with each other. Accordingly, the hydrogen gas can flow from the second pipe P22 of the trailer 12 to the third pipe P33 of the tractor 11 (refer to left middle portion in FIG. 2).

When the outlet connection portion P22o and the inlet connection portion P33i are connected to each other, the fixtures 336 of the inlet connection portion P33i are turned and the tip ends of the fixtures 336 are inserted into the respective recessed portions 2224 of the outlet connection portion P22o. Consequently, the inlet connection portion P33i is fixed to the outlet connection portion P22o. Accordingly, the valve body 224 and the pressing rod 334 are not displaced by a biasing force of the coil spring 226.

With the mechanism as described above, the outlet connection portion P22o is configured to allow flowing of the hydrogen gas when the outlet connection portion P22o and the inlet connection portion P33i are connected to each other, and not to allow flowing of the hydrogen gas when the outlet connection portion P22o and the inlet connection portion P33i are not connected to each other.

With this configuration adopted, the user can switch to a state where the hydrogen gas can be supplied from the trailer 12 to the tractor 11 with a simple procedure by connecting the outlet connection portion P22o of the trailer 12 to the inlet connection portion P33i of the tractor 11.

The fixtures 336 are configured to be fractured prior to a breakage of the configuration of any of the tank 25, the first pipe P21, the pressure reduction portion 27, and the second pipe P22 including the outlet connection portion P22o when a tensile force is applied between the inlet connection portion P33i and the outlet connection portion P22o in the state where the inlet connection portion P33i and the outlet connection portion P22o are connected to each other (refer to FIGS. 2 and 4). In other words, the trailer 12 and the tractor 11 are configured such that, when the tensile force is applied between the inlet connection portion P33i and the outlet connection portion P22o, the outlet connection portion P22o and the inlet connection portion P33i are disconnected from each other prior to a breakage of a part of the configuration that allows flowing of the hydrogen gas from the tank 25 to the outlet connection portion P22o.

With this configuration, advantages as described below are obtained in the case where, when the outlet connection portion P22o and the inlet connection portion P33i are connected to each other, a relative distance between the trailer 12 and the tractor 11 increases for some reason such as a breakage of any of or both of the king pin 24 of the trailer 12 and the coupler 18 of the tractor 11. That is, a breakage of the configuration that allows flowing of the hydrogen gas from the tank 25 to the outlet connection portion P22o does not occur, and therefore the hydrogen gas does not leak (refer to FIG. 4).

The hydrogen gas in the embodiment is also referred to as a "fuel". The hydrogen gas is also referred to as a "fuel gas". The tank 25 is also referred to as a "first tank". The tank 32 is also referred to as a "second tank". The first pipe P21 is also referred to as a "first type pipe". The second pipe P22 is also referred to as a "second type pipe".

B. Other Embodiments

B1. Other Embodiment 1

In the embodiment above, the fuel is the hydrogen gas. However, the fuel may be other substances, for example, hydrocarbons such as methane, ethane, and natural gas. When using the fuel as a fuel gas for a fuel cell, the combination vehicle preferably includes a reformer that reforms hydrocarbons to generate the hydrogen gas. Further, in place of the fuel cell, the tractor may be provided with an internal combustion engine or an external combustion engine that obtains kinetic energy by burning the fuel gas.

In the embodiment above, the tanks 25 and 32 can store the hydrogen gas at a pressure of 70 MPa at the maximum. However, the tank for storing the high-pressure gas may store a liquefied gas instead of the compressed gas. In the present specification, the term "high-pressure gas" means a high-pressure gas specified in Article 2 of the High Pressure Gas Safety Act of Japan (Act No. 204 of 1951, an enforcement law of Apr. 1, 2018). That is, in this specification, "high-pressure gas" refers to any of the following:

(i) Compressed gas, the pressure (meaning gauge; the same shall apply hereinafter) of which is not less than 1 megapascal at its normal operating temperature and which is currently not less than 1 megapascal, or compressed gas, the pressure of which is not less than 1 megapascal at a temperature of 35 degrees Celsius (except compressed acetylene gas in both cases);

(ii) Compressed acetylene gas, the pressure of which is not less than 0.2 megapascal at its normal operating temperature and which is currently not less than 0.2 megapascal, or compressed acetylene gas, the pressure of which is not less than 0.2 megapascal at a temperature of 15 degrees Celsius;

(iii) Liquefied gas, the pressure of which is not less than 0.2 megapascal at its normal operating temperature and which is currently not less than 0.2 megapascal, or liquefied gas, the temperature of which is 35 degrees Celsius or less in the case that the pressure is 0.2 megapascal; or (iv) In addition to what is listed in the preceding (iii), liquefied hydrogen cyanide, liquefied methyl-bromide, or liquefied ethylene oxide of those liquefied gases, the pressure of which exceeds zero pascal at a temperature of 35 degrees Celsius.

In the embodiment above, three tanks 32 in the tractor 11 are shown, and one tank 25 in the trailer 12 is shown (refer to FIG. 1). However, the number of tanks provided in the tractor 11 may be any selected number from one or more. The number of tanks provided in the trailer 12 may be any selected number from one or more. When the plurality of tanks 32 are provided in the tractor 11, the configurations of the plurality of tanks 32 may be the same or different from each other. When a plurality of the tanks 25 are provided in the trailer 12, the configuration of the plurality of tanks 25 may be the same or different from each other.

In the embodiment above, the trailer 12 includes the container 22 (refer to FIG. 1). However, the trailer 12 may be carried out in other modes such as a mode in which the trailer 12 does not include the container 22 and includes a tank that stores a fluid as a transport target or a carrier instead.

B2. Other Embodiment 2

In the embodiment above, the first pipe P21 is made of stainless steel (refer to FIG. 2). However, the first pipe P21 may be made of other materials. Further, the first pipe P21 may have a configuration having a plurality of layers.

In the embodiment above, the portion of the second pipe P22 that connects the pressure reduction portion 27 and the outlet connection portion P22o is made of rubber. However, the second pipe P22 may be made of other materials such as resin. Further, the second pipe P22 may have a configuration having a plurality of layers. However, it is preferable that the second pipe P22 have a lower rigidity than that of the first pipe P21. It is preferable that the second pipe P22 have a configuration that is more easily elastically deformed compared to the first pipe P21.

In the embodiment above, the portion of the second pipe P22 of the trailer 12 that connects the pressure reduction portion 27 and the outlet connection portion P22o has a lower rigidity than that of the first pipe P21. However, the entire second pipe P22 may have a lower rigidity than that of the first pipe P21. Further, the second pipe P22 may partially have a lower rigidity than that of the first pipe P21.

The first pipe P21 may have different configurations along the flowing path of the fuel. For example, a portion of the first pipe P21 on an upstream side may have a configuration that assumes flowing of a liquefied gas. A portion of the first pipe P21 on a downstream side may have a configuration that assumes flowing of a gaseous gas. A configuration that aerifies the liquefied gas may be provided between the upstream portion and the downstream portion of the first pipe P21. Further, the combination vehicle need not have any specific configuration to aerify the liquefied gas, and may include the first pipe P21 that is configured such that the liquefied gas is aerified while the liquefied gas is flowing through the first pipe P21.

The second pipe P22 may have different configurations along the flow path of the fuel. For example, the outlet connection portion P22o and other portions may have different configurations from each other.

In the embodiment above, a pipe for supplying the hydrogen gas in the tank 25 to the outside of the trailer 12 is configured of the first pipe P21 and the second pipe P22 (refer to FIG. 2). However, the pipe for supplying the hydrogen gas in the tank 25 to the outside of the trailer 12 may further include other pipes. Still other pipe may be disposed between the first pipe P21 and the second pipe P22. Still other pipe may be provided such that the pipe branches off from the first pipe P21 or the second pipe P22.

B3. Other Embodiment 3

In the embodiment above, the outlet connection portion P22o is fixed to the inlet connection portion P33i using the fixtures 336 of the inlet connection portion P33i (refer to FIGS. 4 and 5). However, for example, one of the outlet connection portion P22o and the inlet connection portion P33i may include a female screw and the other may include a male screw to fix the outlet connection portion P22o and the inlet connection portion P33i to each other using the female screw and the male screw.

In the embodiment above, the outlet connection portion P22o is configured to allow flowing of the hydrogen gas when the outlet connection portion P22o and the inlet connection portion P33i are connected to each other, and not to allow flowing of the hydrogen gas when the outlet connection portion P22o and the inlet connection portion P33i are not connected to each other (refer to FIGS. 4 and 5). However, the outlet connection portion P22o need not include the function above. For example, the outlet connection portion may be provided with a valve that is configured to allow and prohibit a bidirectional flow of the gas. The valve above need not automatically operate depending on whether the outlet connection portion and the inlet connection portion are connected to each other.

B4. Other Embodiment 4

In the embodiment above, the fixtures 336 are configured to be fractured prior to a breakage of the configuration of any of the tank 25, the first pipe P21, the pressure reduction portion 27, and the second pipe P22 including the outlet connection portion P22o when the tensile force is applied between the inlet connection portion P33i and the outlet connection portion P22o in the state where the inlet connection portion P33i and the outlet connection portion P22o are connected to each other (refer to FIG. 5). However, other components of the inlet connection portion P33i and the outlet connection portion P22o, for example, the body 332 of the inlet connection portion P33i, may be configured to be broken prior to a breakage of any other part of the configuration that allows flowing of the hydrogen gas from the tank 25 to the outlet connection portion P22o.

Further, the combination vehicle 10 need not have the configuration as described above and may have a configuration in which a part of the configuration that allows flowing of the hydrogen gas from the tank 25 to the outlet connection portion P22o is broken first.

B5. Other Embodiment 5

In the embodiment above, the pressure reduction portion 27 of the trailer 12 is disposed below the base portion of the king pin 24 (refer to the lower left portion in FIG. 1). However, the pressure reduction portion may be disposed above the base portion of the king pin.

In the embodiment above, the pressure reduction portion 27 is provided so as to be disposed between the left end 11 seL of the tractor 11 and the king pin 24 in the right-left direction of the tractor 11 in the state where the trailer 12 is coupled to the tractor 11 (refer to the lower right portion in FIG. 3). However, the pressure reduction portion 27 of the trailer 12 may be provided so as to be disposed between a right end 11 seR of the tractor 11 and the king pin 24 in the right-left direction of the tractor 11 in the state where the trailer 12 is coupled to the tractor 11. Further, the pressure reduction portion 27 of the trailer 12 may be provided at other positions of the trailer 12, for example, may be provided forward or rearward of the king pin 24.

B6. Other Embodiment 6

In the embodiment above, the inlet connection portion P33i allows reception of a gas from the outside and does not allow sending out of the gas to the outside using the check valve 331 (refer to FIG. 2). As the check valve 331 described above, various types of check valve, for example, a swing check valve, a lift check valve, and a disc check valve, may be adopted.

On the other hand, the inlet connection portion P33i need not include the check valve 331. For example, the inlet connection portion P33i may be configured to include a valve that allows or prohibits a bidirectional flow of the gas.

The present disclosure is not limited to the embodiments described above, and can be implemented in various configurations without departing from the spirit thereof. For example, technical features in the embodiments corresponding to technical features in the aspects described in the SUMMARY may be appropriately replaced or combined in order to solve some or all of the above-described issues, or in order to achieve some or all of the effects described above. In addition, besides the technical features that are defined to be nonessential in the specification, technical features that are not defined to be essential in the specification may be deleted as necessary.

What is claimed is:

1. A combination vehicle, comprising:
a tractor; and
a trailer towed by the tractor; wherein:
the trailer includes a first tank that is configured to store a high-pressure gas as a fuel used by the tractor to travel;
the tractor includes a second tank that is configured to store a high-pressure gas as a fuel used by the tractor to travel; and
the combination vehicle is configured to travel using the fuel supplied from the first tank and the second tank, wherein
the trailer includes a first pipe that is configured to be connected to the first tank,
the trailer includes a pressure reduction portion that is configured to be connected to the first pipe and reduce a pressure of the fuel gas supplied from the first tank through the first pipe,
the trailer includes a second pipe connected to the pressure reduction portion and an inlet connection portion provided in the tractor, and at least a part of the second pipe has a lower rigidity than a rigidity of the first pipe, and
the trailer includes a king pin that is configured to be coupled to a coupler of the tractor, and the pressure reduction portion is disposed below a base portion of the king pin.

2. The combination vehicle according to claim 1, wherein the second pipe includes an outlet connection portion that is configured to be connected to the inlet connection portion.

3. The combination vehicle according to claim 2, wherein the outlet connection portion is configured to allow flowing of the fuel gas when the outlet connection portion is connected to the inlet connection portion, and not to allow flowing of the fuel gas when the outlet connection portion is not connected to the inlet connection portion.

4. The combination vehicle according to claim 2, wherein the trailer is configured such that the outlet connection portion and the inlet connection portion are disconnected prior to a breakage of a part of a configuration that allows flowing of the fuel from the first tank to the outlet connection portion when a tensile force is applied between the inlet connection portion and the outlet connection portion in a state where the inlet connection portion and the outlet connection portion are connected to each other.

5. The combination vehicle according to claim 4, wherein the trailer is configured such that the outlet connection portion and the inlet connection portion are disconnected by a breakage of a part of a configuration of the inlet connection portion and the outlet connection portion prior to the breakage of the part of the configuration that allows flowing of the fuel from the first tank to the outlet connection portion.

6. The combination vehicle according to claim 1, wherein the pressure reduction portion is provided so as to be disposed between an end of the tractor and the king pin in a right-left direction of the tractor in a state where the trailer is coupled to the tractor via the king pin and the coupler.

7. The combination vehicle according to claim 1, wherein the inlet connection portion includes a check valve that is configured to allow reception of a gas from an outside and not to allow sending out of the gas to the outside.

8. A trailer that is configured to be coupled to a tractor that travels using a fuel gas, the trailer comprising:
- a tank that is configured to store a high-pressure gas as a fuel used by the tractor to travel;
- a first pipe that is configured to be connected to the tank;
- a pressure reduction portion that is configured to be connected to the first pipe and reduce a pressure of the fuel gas supplied from the tank through the first pipe;
- a second pipe that is configured to be connected to the pressure reduction portion and includes an outlet connection portion that is configured to be connected to an inlet connection portion that is provided in the tractor and receives the fuel gas, wherein at least a part of the second pipe has a lower rigidity than a rigidity of the first pipe; and
- a king pin that is configured to be coupled to a coupler of the tractor, wherein the pressure reduction portion is disposed below a base portion of the king pin.

9. The trailer according to claim 8, wherein the outlet connection portion is configured to allow flowing of the fuel gas when the outlet connection portion is connected to the inlet connection portion, and not to allow flowing of the fuel gas when the outlet connection portion is not connected to the inlet connection portion.

10. The trailer according to claim 9, wherein the trailer is configured such that the outlet connection portion and the inlet connection portion are disconnected prior to a breakage of a part of a configuration that allows flowing of the fuel from the tank to the outlet connection portion when a tensile force is applied between the inlet connection portion and the outlet connection portion in a state where the inlet connection portion and the outlet connection portion are connected to each other.

11. The trailer according to claim 10, wherein the trailer is configured such that the outlet connection portion and the inlet connection portion are disconnected by a breakage of a part of a configuration of the inlet connection portion and the outlet connection portion prior to the breakage of the part of the configuration that allows flowing of the fuel from the tank to the outlet connection portion.

12. The trailer according to claim 8, wherein the pressure reduction portion is provided so as to be disposed between an end of the tractor and the king pin in a right-left direction of the tractor in a state where the trailer is coupled to the tractor via the king pin and the coupler.

13. A tractor that is coupled to the trailer according to claim 8, the tractor comprising the inlet connection portion, wherein the inlet connection portion includes a check valve that is configured to allow reception of a gas from an outside and not to allow sending out of the gas to the outside.

14. A combination vehicle comprising the trailer according to claim 8, and a tractor, wherein:
- the tank is a first tank;
- the tractor includes a second tank that is configured to store a high-pressure gas as a fuel used by the tractor to travel; and
- the combination vehicle is configured to travel using the fuel supplied from the first tank and the second tank.

* * * * *